United States Patent [19]

McCaw

[11] Patent Number: 5,148,730
[45] Date of Patent: Sep. 22, 1992

[54] SAWMARK GUIDE

[76] Inventor: Ronald A. McCaw, 350 Kingsway Ave., North Bay, Ontario, Canada, P1B 7V6

[21] Appl. No.: 632,993

[22] Filed: Dec. 24, 1990

Related U.S. Application Data

[63] Continuation of Ser. No. 327,084, Mar. 22, 1989, abandoned.

[30] Foreign Application Priority Data

Mar. 24, 1988 [CA] Canada .................................. 562303

[51] Int. Cl.$^5$ .............................................. B27B 9/04
[52] U.S. Cl. ........................................ 83/745; 83/574; 83/522.18; 83/522.25
[58] Field of Search ............... 83/745, 522.17, 522.18, 83/522.19, 522.25, 574

[56] References Cited

U.S. PATENT DOCUMENTS

| 2,705,029 | 3/1955 | Zophel | 83/745 |
|---|---|---|---|
| 2,823,709 | 2/1958 | Konieczka | 83/745 |
| 2,942,633 | 6/1960 | King | 83/745 |
| 3,913,440 | 10/1975 | Baker | 83/745 |
| 4,031,794 | 6/1977 | Leihgeber | 83/745 |
| 4,056,028 | 11/1977 | Patterson | 83/745 |
| 4,075,920 | 2/1978 | Neal | 83/745 |
| 4,179,965 | 12/1979 | Johnson | 83/745 |
| 4,291,602 | 9/1981 | Fast et al. | 83/745 |
| 4,852,275 | 8/1989 | Moore | 83/745 |

FOREIGN PATENT DOCUMENTS

| 2939769 | 4/1981 | Fed. Rep. of Germany . |
| 2124976 | 2/1984 | United Kingdom . |

Primary Examiner—Hien H. Phan
Attorney, Agent, or Firm—Hoffman, Wasson & Gitler

[57] ABSTRACT

A saw guide for use with a portable powered hand saw comprises a base which terminates in a saw guiding edge and is hinged to a flap. Means are provided to anchor the base to the work piece. The flap has an extensible end having a transparent portion with a reference line inscribed therein parallel to the saw guiding edge. After the extensible end of the flap has been set for the particular saw (and the particular bevel angle of the blade) to be used, the base with flap is placed on the work piece and the saw guide is moved until the reference line is in coincidence with the desired line of the cut. The base is then anchored to the work piece and the flap flipped out of the way exposing the saw guiding edge.

19 Claims, 4 Drawing Sheets

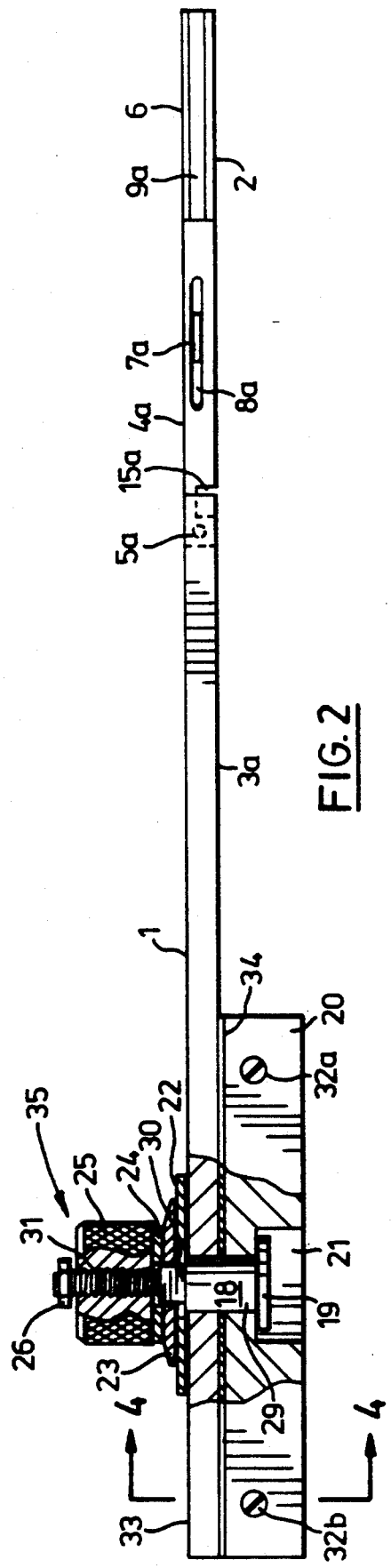
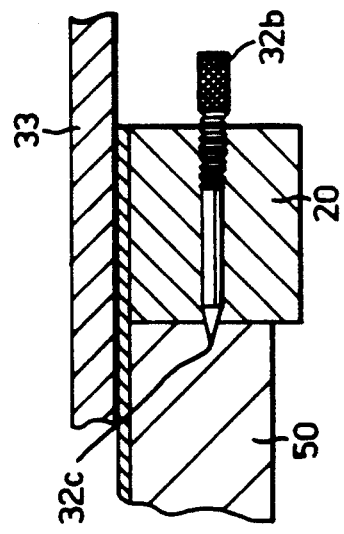
FIG. 2
FIG. 4

SAWMARK GUIDE

"This is a continuation of copending application Ser. No. 07/327,084 filed on Mar. 22, 1989, now abandoned.

BACKGROUND OF THE INVENTION

1. Field of the Invention

This invention relates to a saw guide for use with a portable powered hand saw.

2. Description of the Prior Art

Various saw guides have been proposed in order to facilitate the making of accurate cuts by a portable powered saw, such as a circular saw. Some such guides, such as that disclosed in Canadian Patent 903,060 dated Jun. 20, 1972 to Stachejcjuk, are hand-steadied; however, such a guide could move resulting in an inaccurate cut. Other guides, such as that disclosed in U.S. Pat. No. 4,031,794 issued Jun. 28, 1977 to Leihgeber are clamped to a work piece. More sophisticated guides, such as that disclosed in Canadian Patent 905,807 issued Jul. 25, 1972 to Stocker, slidably mount the portable saw to the guide; these guides are more expensive.

While some of the known guides may be able to position the saw blade parallel to the desired line of the cut, none ensure the cut will be accurately positioned at the desired line of the cut without trial and error, which wastes time and may damage the work piece. Thus, there remains a need for a guide for a portable powered saw which ensures the cut will be made at the desired line of the cut without trial and error.

SUMMARY OF THE INVENTION

Accordingly, there is provided a saw guide for a portable powered hand saw comprising a base having a saw guiding edge, means to anchor the base to a work piece, a flap hinged to the base including a reference means parallel to the saw guiding edge, the flap being movable between a first position wherein the reference means may overlie a work piece and a second position wherein the saw guiding edge is exposed. The reference means is preferably provided as one or more lines inscribed on a transparent portion of the flap.

BRIEF DESCRIPTION OF THE DRAWINGS

In the drawings which illustrate embodiments of the invention,

FIG. 2 is a side view of the guide of FIG. 1, FIG. 4 is a broken sectional view along the lines 4-4 of FIG. 2.

DESCRIPTION OF THE PREFERRED EMBODIMENTS

Figure 1:
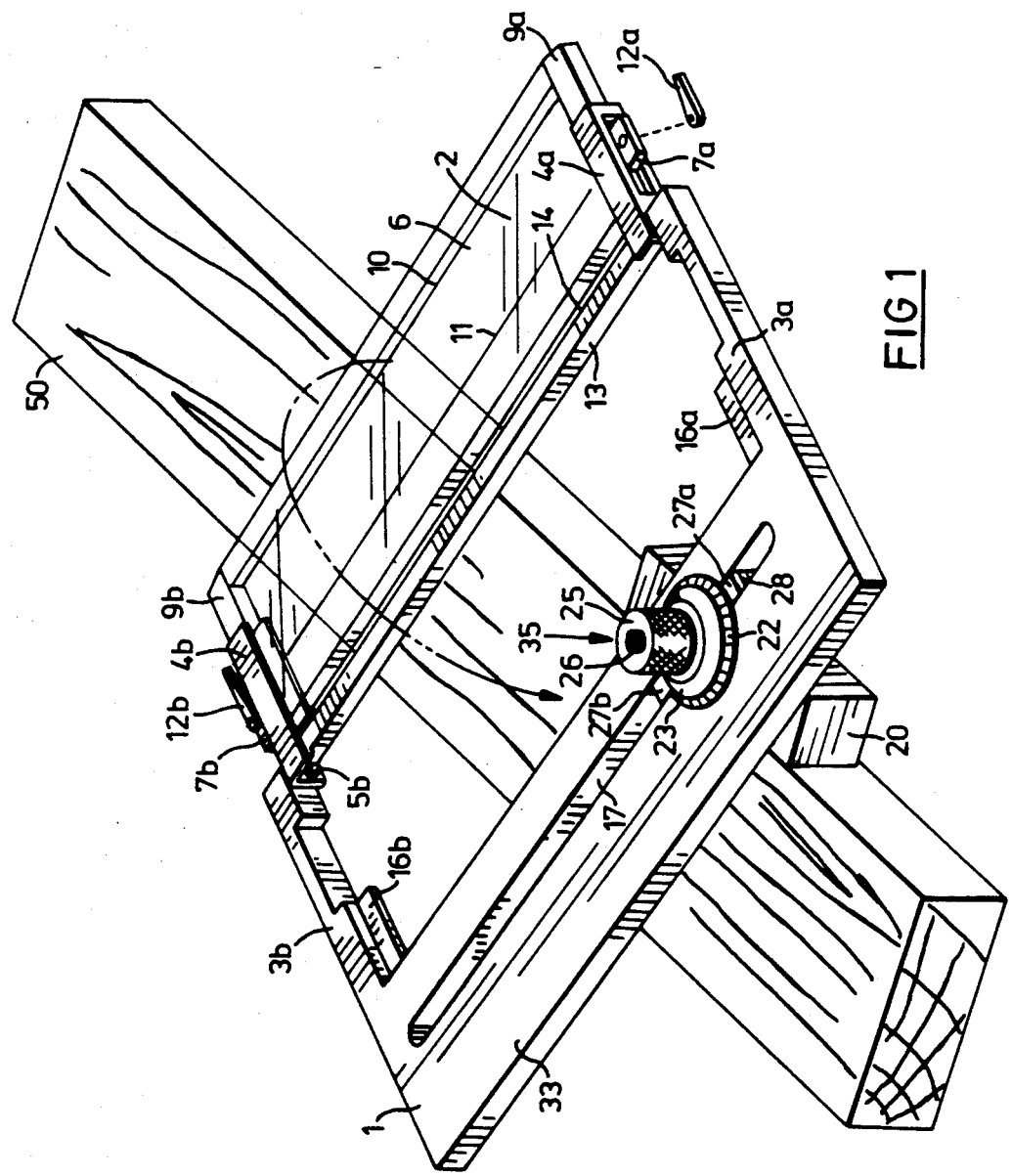
FIG. 1 is a perspective view of a saw guide according to one embodiment of this invention.

Turning now to FIGS. 1 and 2, the saw guide comprises a base 1 and a flap 2. Mounting brackets 4a, 4b of flap 2 are hinged to the arms 3a and 3b of the base 1 by pivot screws 5a and 5b.

Mounting bracket 4a of flap 2 surrounds reduced thickness margin 9a of transparent plate 6 and mounting bracket 4b surrounds reduced thickness margin 9b. A tab 7a projecting from margin 9a of the transparent plate projects through a slot 8a in the mounting bracket 4a. Similarly, a tab 7b on margin 9b projects through a similar slot in mounting bracket 4b. Toggle clamps 12a and 12b are eccentrically pivoted to the tabs 7a and 7b, respectively and operated to clamp transparent plate 6 between mounting brackets 4a and 4b.

The transparent plate 6 has reference means which are marking lines 10 and 11 inscribed in the bottom surface of the transparent plate.

Figure 3:
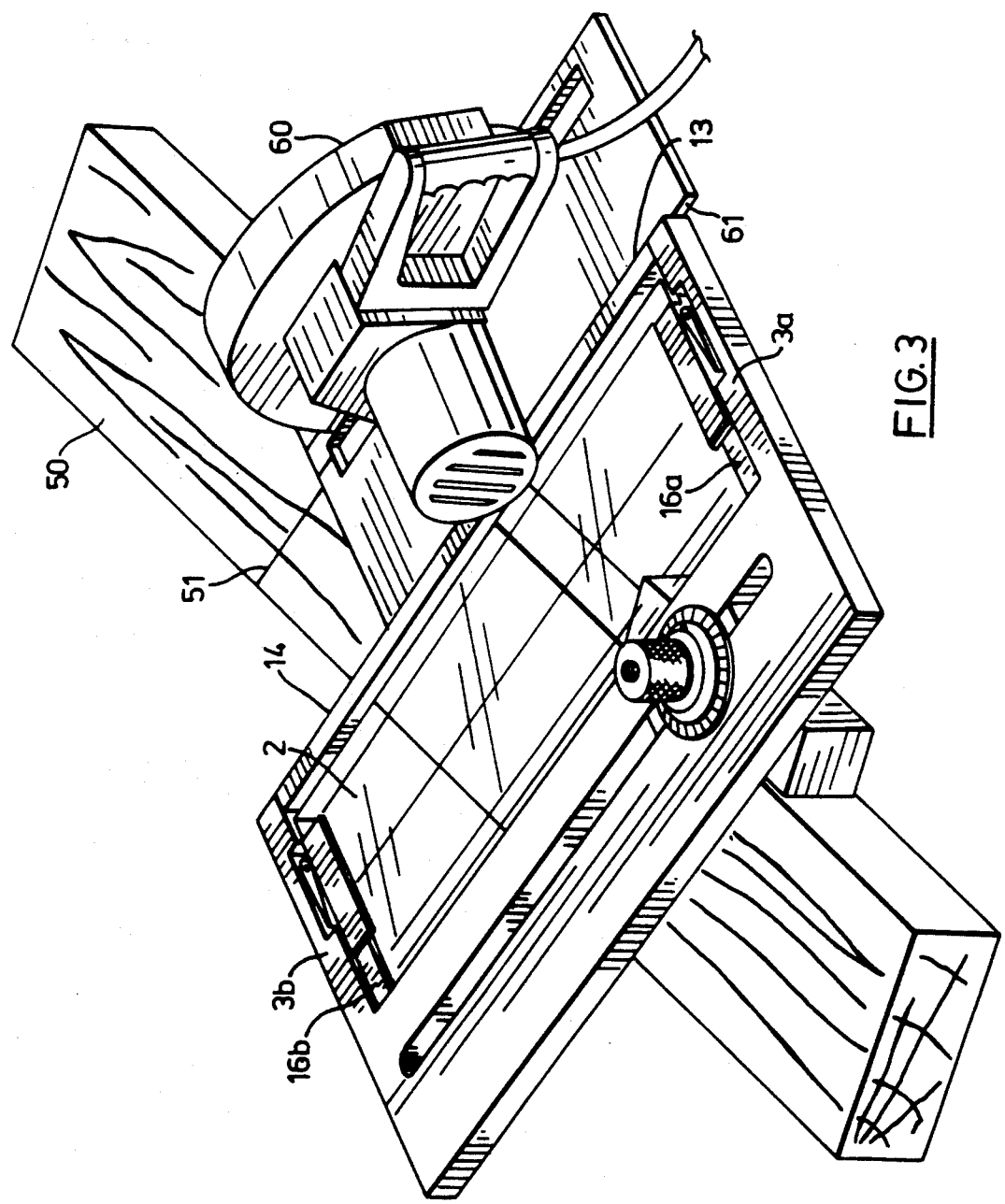
FIG. 3 is a perspective view of the guide of FIG. 1 being used with a power saw.

As is evident from FIG. 3, in the retracted position of the flap, it is received entirely within the recess defined by the arms 3a and 3b, and rests upon the ledges 16a and 16b so that it does not project substantially above the upper side of the base 1 or of the guide piece 13.

Arms 3a and 3b also support a guide piece 13. The outside edge of guide piece 13 is a saw guiding edge 14. A notch 15a in mounting bracket 4a, and a similar notch in mounting bracket 4b, permits arms 3a and 3b to support the guide piece 13 without interference from the mounting brackets 4a and 4b. Each arm 3a, 3b also has an inwardly directed ledge 16a, 16b near its junction with the base 1.

Body 33 of base 1 has a slot 17 traversing substantially the full width thereof. An anchor block 20 is located underneath base 1 at slot 17. A pivot bolt 18 (FIG. 2) extends through a cylindrical stepped opening 21 in the anchor block 20 and projects through the slot 17 and terminates above the base 1.

The flange 19 and shank 29 of the pivot bolt 18 are circular in cross section. The stepped middle section 30 of pivot bolt 18 is of square cross section, and the pivot bolt 18 terminates in threaded end 31.

The flange 19 of the pivot bolt 18 abuts the step of cylindrical stepped opening 21 of the anchor block 20. The shank 29 of pivot bolt 18 extends through the top of anchor block 20 and the square middle section 30 extends through the slot 17. A graduated protractor ring 22 with a central opening larger than the middle section 30 of pivot bolt 18 rests on the top surface of base 1. Tabs 27a, 27b of the graduated ring 22 include aligning tongues 28 which project into the slot 17. The square opening of a pointer ring 23 fits snugly over the shaft middle section 30. A friction washer 24 fits loosely over the pivot bolt 18 and rests atop the pointer ring 23. A thumbwheel 25 overlies the friction washer and is threaded to threaded end 31 of he pivot bolt. Locknut 26 is also threaded to threaded end 31 of the pivot bolt 18.

The graduated ring, pointer ring, friction washer, thumbwheel, and locknut together comprise an angle positioning assembly 35. Note that the stepped shaft middle 30 may also be of octagonal or other non-circular cross-section, in which case the pointer ring 23 would be formed with a substantially complimentary octagonal or non-circular opening.

As shown in FIGS. 2 and 4, anchor block 20 supports retractable work piece piercing pins 32a and 32b. These pins are in threaded engagement with bores in the block 20 and have pointed ends 32c which can be advanced beyond or retracted within the block 20.

The underside of body 33 of base 1 may be covered with a thin layer of cork or other along wearing high friction material as illustrated at 34.

With reference to FIGS. 1 through 3, in order to use the saw guide, toggle clamps 12a and 12b are opened and the transparent plate 6 of flap 2 is positioned so that, when the flap is rotated to its deployed position shown in FIGS. 1 and 2, the perpendicular distance between one of the marking lines 10 or 11 and the saw guide edge 14 is equal to the distance between the saw blade and a guidable edge 61 of the portable power saw 60 that is to be used with the guide. Toggle clamps 12a and 12b are then closed to secure the transparent plate 6 in this position. It should be noted that this adjustment need only be made when the distance between the saw base plate and saw blade edge of the power saw is altered. Thus, the adjustment is only required when a different make of saw is employed, the saw blade is changed to one of a different thickness, or the bevel angle of the blade is altered. In the latter case, canting the blade with respect to the saw base alters the relevant distance as the blade is tilted at its axis of rotation since this axis lies above the base plate of the saw. Marking line 10 is normally used with regular circular saws and marking line 11 is normally used with routers and screw drive or worm drive circular saws, which have narrower base plates.

A line (shown at 51 in FIG. 3) representing the desired cut on a work piece 50 may then be inscribed on the work piece. Next, work piece piercing pins 32a and 32b in anchor block 20 are extended so that their points 32c extend beyond the face of the anchor block. Base 1 with flap 2 is then positioned on the work piece 50 with flap 2 in its deployed position shown in FIGS. 1 and 2 and the entire saw guide si then moved until the appropriate one of he marking lines 10 and 11 is coincident with the line (51 in FIG. 3) inscribed on the work piece 50. To achieve this the locknut 26 and thumbwheel 25 of angle positioning assembly 35 is loosened and the anchor block 20 turned till the face of the anchor block from which pins 32a and 32b protrude is parallel to the side of the work piece. The anchor block 20 with angle positioning assembly 35 is then moved along slot 17 till the pins 32a, 32b of the anchor block pierce the side of the work piece. When the appropriate marking line 10 or 11 has been registered with the line 51 the thumbwheel 25 is tightened, locking the angle of anchor block 20 with respect to base 1 and locking anchor block 20 in slot 17. It will be noted that the slot 17 extends through substantially the full width of the base 1 so that it can accommodate various widths of lumber. It is also adapted for use by left-handed people since the angle positioning assembly 35 can obviously be reversed and operated from the opposite end of the slot. The assembly 35 can also be moved to one end of the slot to be out of the way to permit the use of alternative means to locate the saw guide with respect to the saw guide — e.g. in a Black and Decker Workmate (Trade mark) bench using specially provided clamps.

FIG. 1 illustrates the saw guide on work piece 50 after completion of these steps. A hand of the operator pressing on the top face of body 33 of base 1 together with anchor block 20 and the work piece piercing pins 32a, 32b cooperate to anchor the saw guide with respect to the work piece. The graduated ring 22 indicates the angle of the line which is to be cut in the work piece. Alternatively, the angle of the line to be cut can be set on the graduated ring 22 and the orientation of line 51 fixed accordingly.

Flap 2 may then be flipped about the axis of its pivot screws 5a, 5b to the retracted position wherein the flap rests on ledges 16a, 16b of arms 3a, 3b, as illustrated in FIG. 3. This exposed saw guiding edge 14 so that when the guidable edge 61 of the power saw 60 is abutted with saw guiding edge 14, the blade of the saw is accurately registered with the line 51 inscribed on the work piece, as illustrated in FIG. 3.

Subsequent accurate cuts may be made with the particular saw 60 merely by inscribing the desired line of the cut, positioning the saw guide appropriately and securing same to the work piece and flipping the flap to its retracted or closed position, as before.

If desired to anchor the base 1 with flap 2 to the work piece by alternate means, locknut 26 and thumbwheel 25 may be loosened and the angle positioning assembly 35 and anchor block 20 may be slid to the extreme end of slot 17 proximate the edge of body 33 of base 1. The thumbwheel and locknut may then be tightened to secure the angle positioning assembly 35 and anchor block 20 in this position.

Figure 5:
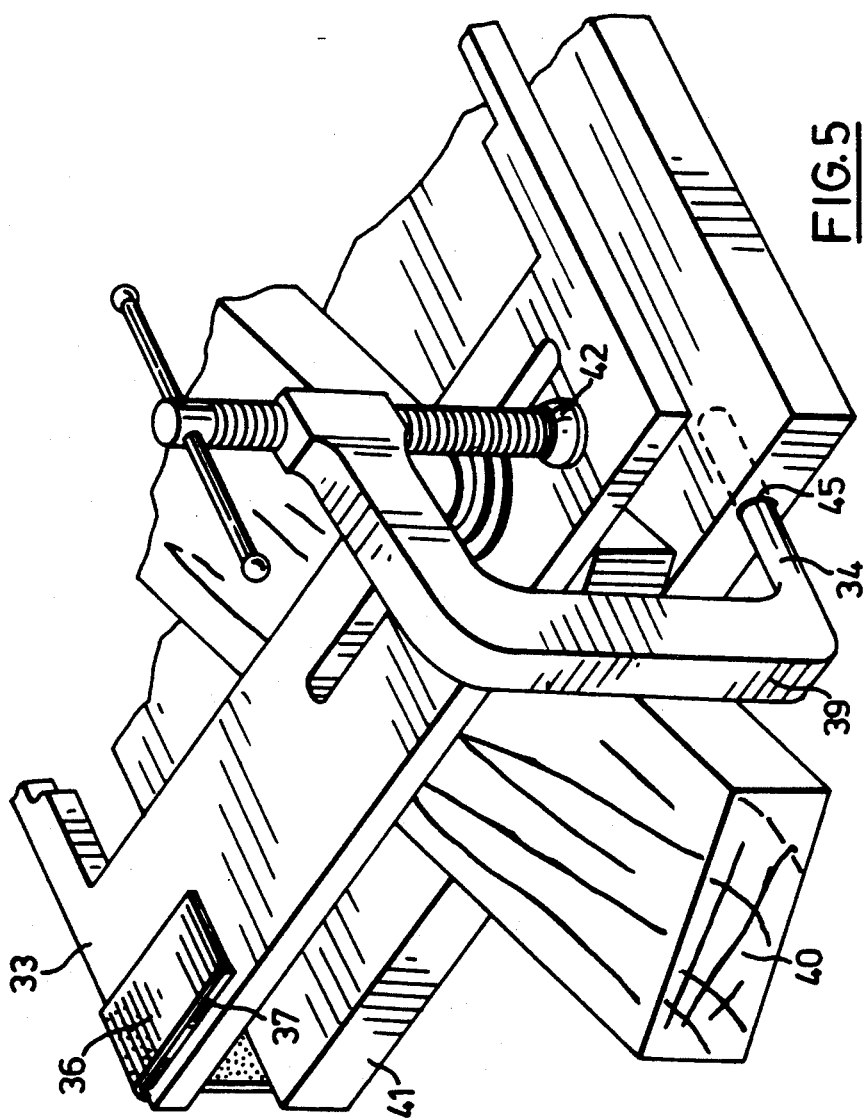
FIG. 5 is a perspective partial view of a saw guide according to another embodiment of this invention.

FIG. 5 illustrates an alternate means of anchoring body 33 of base 1 to a work piece 40. A Velcro (Trade mark) strip 36 is affixed at one end to one end of a supporting plate 41 and a mating piece of Velcro material 37 is affixed to the upper surface of body 33 of base 1. Supporting arm 34 of a clamp 39 is received in a hole 45 proximate the opposite end of the supporting plate 41.

In operation, base 1 with flap 2 (as shown in FIGS. 1 and 2) is placed over the work piece 40 with the flap 2 in its open deployed position. Base 1 with flap 2 is positioned so that the appropriate marking line 10 or 11 (shown in FIG. 1) is coincident with the line of the desired cut marked on the work piece. Supporting plate 41 is then placed under work piece 40. Velcro strip 36 is then mated with Velcro material 37 securing one end of the base 1 and plate 41. Clamp 39 is then rotated in the hole proximate the opposite end of plate 41 to a vertical position and is tightened till the pad 42 of the clamp abuts the upper surface of the base 1 and the base 1 and plate 41 clamp the work piece between them. The saw guide is thus securely fixed to the workpiece 40 and may be employed as before.

Base 1 together with flap 2 could also be anchored to a work piece by any device having a work piece supporting surface and clamps positionable at either end of the body 33 of base 1, such as the Black and Decker Workmate with the Black and Decker Gripmate (Trade mark).

Transparent plate 6 could be replaced by an open frame, in which case reference markings 10 and 11 could be provided by wires supported by the sides of the frame. Alternatively, transparent plate 6 could be replaced by a basal support member proximate the mounting brackets to which a transparent plate is riveted.

Means other than the toggle clamps 12a, 12b may be provided for adjustable retention of the transparent plate 6 of the flap 2. Thus, in a modified arrangement (not shown) the mounting brackets 4a, 4b are modified to omit the slots and to receive spacer bars. The latter engage against the sides of the plate 6 and can be fixed to lock the latter in position by means of adjustment screws threaded into the brackets 4a, 4b these screws being slackened when it is desired to adjust the transparent plate to a new position. Alternatively the spacer bars can be omitted and the adjusting screws engaged directly with the sides of the plate 6.

What I claim as my invention is:

1. A saw guide for use in conjunction with a portable powered hand saw to position and guide the latter to perform a cut at a predetermined location in a flat elongate workpiece, said saw guide comprising:

a base having a saw guiding edge;

a flap pivotally attached to said base, said flap including at least one linear reference means thereon, said flap being movable about its pivot axis between a first position wherein it is extended laterally of said base so that said reference means is positioned outwardly of said saw guiding edge at a predetermined spacing therefrom and a second position wherein said flap is retracted so that said saw guiding edge is exposed for guiding abutment with the portable hand saw; and anchor means carried by said base and selectively operable to anchor the base to the workpiece;

said base defining a recess into which said flap is received such that in said second position said flap does not project substantially above said base; and said reference means being positioned so that with the flap in said first position alignment of said reference means with said predetermined cut location locates said base in a position wherein said guiding edge can guide the and saw to perform the desired cut at said predetermined location.

2. The saw guide of claim 1 further including:
flap extension means for adjusting the distance between said reference means and said pivot axis.

3. The saw guide of claim 1 wherein said reference means comprises at least one line inscribed in a transparent portion of said flap.

4. The saw guide of claim 2 wherein said reference means comprises at least one line inscribed in a transparent portion of said flap.

5. The saw guide of claim 1 wherein said means to anchor said base to a work piece comprises an anchor block supported by said base having work piece piercing means.

6. The saw guide of claim 5 wherein said base includes a guide and said anchor block is movable along said guide.

7. The saw guide of claim 5 including means to rotate said anchor block with respect to said base and means to indicate the angle of rotation.

8. The saw guide of claim 1 wherein said means to anchor said base to a work piece comprises:
(a) supporting means for positioning under said work piece;
(b) first clamp means for association with said supporting means and one end of said base;
(c) second clamp means for association with said supporting means and the other end of said base; wherein said first and second clamping means are for cooperating to clamp a work piece between said base and said supporting means.

9. The saw guide of claim 1 further including flap extension means for adjusting the distance between said reference means and said saw guiding edge, said anchor means comprising an anchor block supported by said base and having workpiece gripping means to secure said base with respect to the workpiece.

10. The saw guide of claim 9 wherein said base includes a guide extending parallel to said guiding edge, said anchor block being selectively engageable to said base throughout the length of said guide.

11. The saw guide of claim 10 wherein said guide includes means to rotate said base with respect to said anchor block, and means to indicate the angular position of said saw guiding edge with respect to said anchor block.

12. A tool guide for use in conjunction with a portable powered hand tool to position and guide the latter to perform a cut at a predetermined location in a flat elongate workpiece, said tool guide comprising:

a base having a guiding edge;

a flap pivotally attached to said base, said flap including at least one linear reference means thereon, said flap being movable about its pivot axis between a first position wherein it is extended laterally of said base so that said reference means is positioned outwardly of said guiding edge at a predetermined spacing therefrom, and a second position wherein said flap is retracted so that said guiding edge is exposed for guiding abutment with the portable hand tool; and anchor means carried by said base and selectively operable to anchor the base to the workpiece;

said base defining a recess into which said flap is received such that in said second position said flap does not project substantially above said base; and said reference means being positioned so that with the flap in said first position alignment of said reference means with said predetermined cut location locates said base in a position wherein said guiding edge can guide the hand tool to perform the desired cut at said predetermined location.

13. The tool guide of claim 12 further including flap extension means for adjusting the distance between said reference means and said guiding edge, said anchor means comprising an anchor block supported by said base and having workpiece gripping means to secure said base with respect to the workpiece.

14. The tool guide of claim 13 wherein said base includes a guide extending parallel to said guiding edge, said anchor block being selectively engageable to said base throughout the length of said guide.

15. The tool guide of claim 14 wherein said guide includes means to rotate said base with respect to said anchor block, and means to indicate the angular position of said guiding edge with respect to said anchor block.

16. A saw guide for use in conjunction with a portable powered hand saw to position and guide the latter to perform a cut at a predetermined location in a flat elongate workpiece, said saw guide comprising:

a base having a saw guiding edge;

a flap pivotally attached to said base, said flap including linear reference means thereon, said flap being movable about its pivot axis between a first position wherein it is extended laterally of said base so that said reference means is positioned outwardly of said saw guiding edge at a predetermined spacing therefrom, and a second position wherein said flap is retracted so that said saw guiding edge is exposed for guiding abutment with the portable hand saw; and anchor means carried by said base and selectively operable to anchor the base to the workpiece;

said anchor means comprising workpiece gripping means adapted to engage the workpiece and locate said saw guide at a selected location longitudinally thereof, said workpiece gripping means comprising an anchor block and attachment means providing for rotation between said anchor block and said base of the saw guide;

said reference means being positioned so that with the flap in said first position alignment of said reference means with said predetermined cut location locates said base in a position wherein said guiding edge can guide the hand saw to perform the desired cut at said predetermined location;

said base including a guide extending parallel to said guide edge, said anchor block being selectively engageable to said base through the length of said guide;

said saw guide including means to rotate said base with respect to said anchor block, and means to indicate the angular position of said saw guiding edge with respect to said anchor block.

17. A saw guide for use in conjunction with a portable powdered hand saw to position and guide the latter to perform a cut at a predetermined location in a flat elongate workpiece, said saw guide comprising:

a base having a saw guiding edge;

a flap pivotally attached to said base, said flap including linear reference means thereon, said flap being movable about its pivot axis between a first position wherein it is extended laterally of said base so that said reference means is positioned outwardly of said saw guiding edge at a predetermined spacing therefrom, and a second position wherein said flap is retracted so that said saw guiding edge is exposed for guiding abutment with the portable hand saw; and anchor means carried by said base and selectively operable to anchor the base to the workpiece, said anchor means comprising workpiece gripping means formed by an anchor block adapted to grippingly engage a longitudinal edge surface of the workpiece to locate the saw guide with respect thereto without clamping;

said reference means being positioned so that with the flap in said first position alignment of said reference means with said predetermined cut location locates said base in a position wherein said guiding edge can guide the hand saw to perform the desired cut at said predetermined location;

said base including a guide extending parallel to said guiding edge, said anchor block being selectively engageable to said base through the length of said guide;

said saw guide including means to rotate said base with respect to said anchor block, and means to indicate the angular position of said saw guiding edge with respect to said anchor block.

18. A saw guide for use in conjunction with a portable powered hand saw to position and guide the latter to perform a cut at a predetermined location in a flat elongate workpiece, said saw guide comprising:

a base having a saw guiding edge;

a flap pivotally attached to said base, said flap including linear reference means thereon, said flap being movable about its pivot axis between a first position wherein it is extended laterally of said base so that said reference means is positioned outwardly of said saw guiding edge at a predetermined spacing therefrom, and a second position wherein said flap is retracted within a recess provided in said base so that said saw guiding edge is exposed for guiding abutment with the portable hand saw; and anchor means carried by said base and selectively operable to anchor the base to the workpiece, said anchor means comprising:

supporting means that is adapted to be positioned under said workpiece;

first clamp means for association with said supporting means and one end of said base;

second clamp means for association with said supporting means and the other end of said base;

wherein said first and second clamping means are adapted to cooperate to clamp the workpiece between said base and said supporting means;

said reference means being positioned so that with the flap in said first position alignment of said reference means with said predetermined cut location locates said base in a position wherein said guiding edge can guide the hand saw to perform the desired cut at said predetermined location;

said saw guide further including flap extension means for adjusting the distance between said reference means and said saw guiding edge, said anchor means comprising an anchor block supported by said base and having workpiece gripping means to secure said base with respect to the workpiece;

said base including a guide extending parallel to said guiding edge, said anchor block being selectively engageable to said base throughout the length of said guide.

19. The saw guide of claim 18 wherein said guide includes means to rotate said base with respect to said anchor block, and means to indicate the angular position of said saw guiding edge with respect to said anchoring block.

* * * * *